Figures 1, 2:
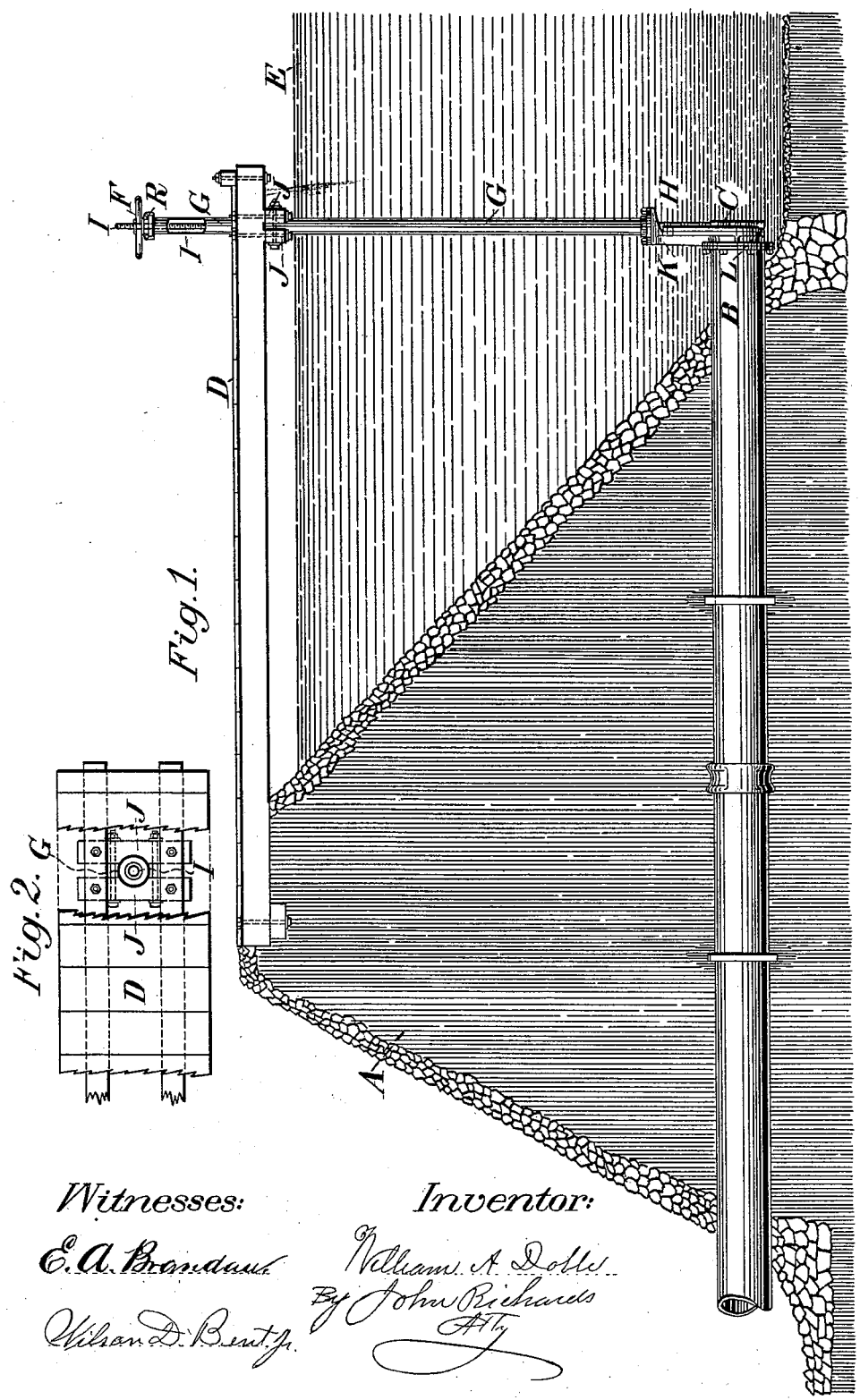

(No Model.) 2 Sheets—Sheet 1.

W. A. DOBLE.
SLUICE VALVE.

No. 521,106. Patented June 5, 1894.

Witnesses:
E. A. Brandau
Wilson D. Bent Jr.

Inventor:
William A. Doble
By John Richards
Att'y

THE NATIONAL LITHOGRAPHING COMPANY,
WASHINGTON, D. C.

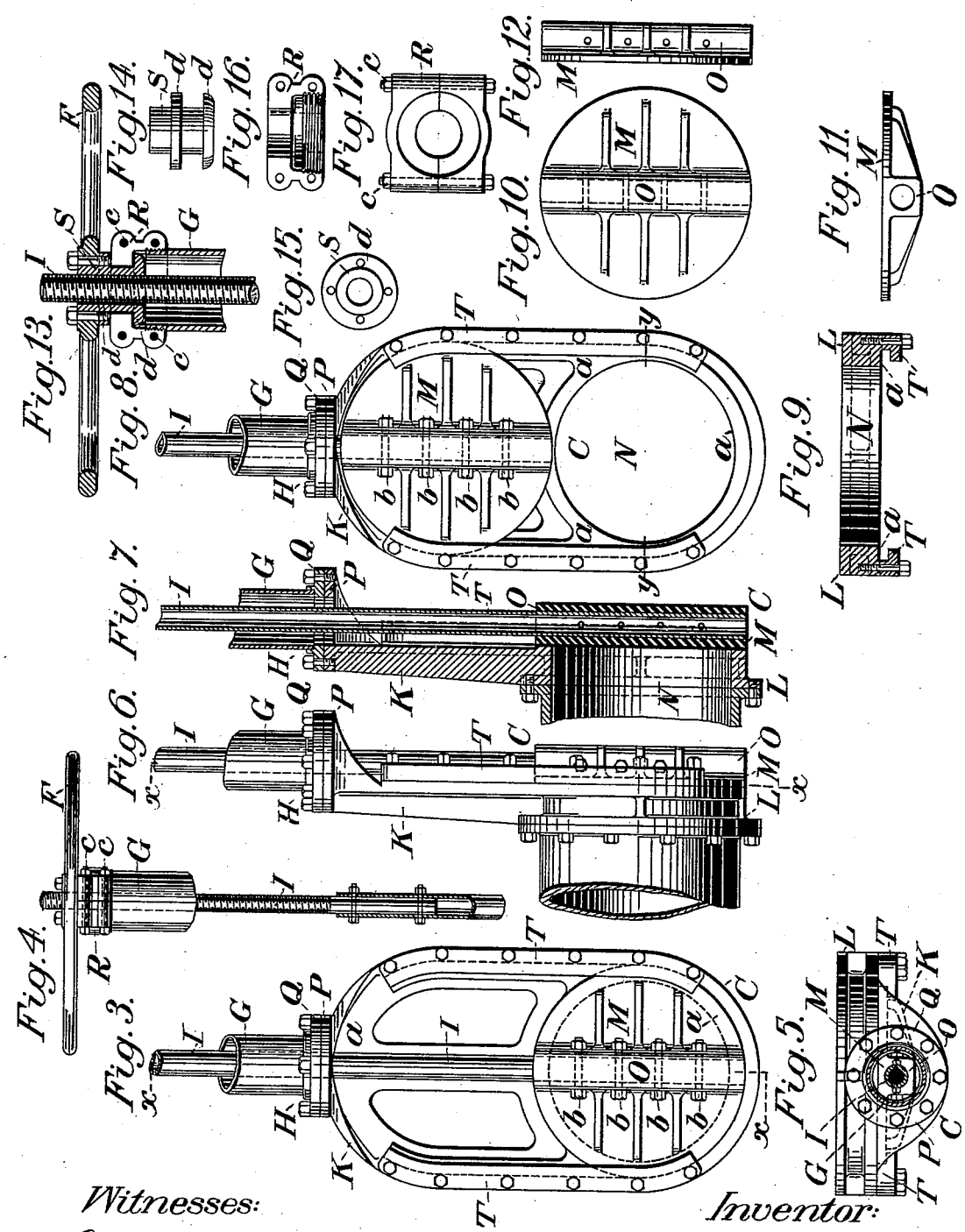

UNITED STATES PATENT OFFICE.

WILLIAM A. DOBLE, OF SAN FRANCISCO, CALIFORNIA.

SLUICE-VALVE.

SPECIFICATION forming part of Letters Patent No. 521,106, dated June 5, 1894.

Application filed June 17, 1893. Serial No. 477,961. (No model.)

*To all whom it may concern:*

Be it known that I, WILLIAM A. DOBLE, a citizen of the United States, residing in the city and county of San Francisco, State of California, have invented certain new and useful Improvements in Sluice-Valves, as set forth and explained in the specification and drawings herewith, which I declare to be a full, clear, and exact description of my improvements.

My invention relates to sluice valves or gates, such as are employed in the conveyance and distribution of water, forming stop valves in conduits and pipes therefor.

My improvements consist in so constructing such apparatus that the force and strains of opening and closing the valves will be inherent in the valve structure and its connections, and not fall on the pipes to which the valves are attached, or to any independent structure outside, also in the method of stopping the valve at the end of its opening and closing ranges by oblique or curved surfaces that cannot be clogged by roots, driftwood, gravel or other débris the water may contain.

My invention also includes various other features of a constructive kind, as will be more fully pointed out in the drawings, in which—

Figure 1 is an elevation in section of a water-retaining wall or dam having an outlet pipe fitted with one of my improved sluice valves. Fig. 2 is a partial plan view of the platform from which the valve is operated, showing the manner of connecting and sustaining the parts when the valves are applied as shown in Fig. 1. Fig. 3 is an enlarged front view of my improved sluice valves when closed. Fig. 4 is a side view of the stem and operating parts completing Fig. 3. Fig. 5 is a plan view on the top of the valve shown in Fig. 3. Fig. 6 is an edge view of Fig. 3. Fig. 7 is a vertical section on the line $x$—$x$ of Figs. 3 and 6. Fig. 8 is a front view, the same as Fig. 3, but showing the valve wide open. Fig. 9 is a cross section on the line $y$ $y$ of Fig. 8. Fig. 10 is a front view of the valve-plate detached. Fig. 11 is an end or top view of Fig. 10. Fig. 12 is an edge view of Fig. 10. Fig. 13 is a central section through the hand wheel, and gearing for opening and closing the valve. Fig. 14 is a side view of the screw nut through which the valve stem passes. Fig. 15 is an end view of the screw nut shown in Fig. 14. Fig. 16 is a front view of one half of the clamp bearing, supporting the screw nut for the valve stem. Fig. 17 is a plan view of this clamp bearing.

Similar letters of reference indicate corresponding parts throughout the different figures of the drawings.

Referring first to Fig. 1, A is a retaining embankment or dam, and B a sluice pipe through which the water E is discharged.

C is a sluice valve made according to my improvements, and F a hand wheel for operating the same, and D a platform affording access to the hand wheel F and top gearing of the valve.

G is a pillar or tube, preferably the latter, attached to the valve frame at H, and extending up to receive a screw nut and hand wheel F at the top, the valve stem I passing down within this tube. This platform D is supported on this pillar or tube by means of the cross timbers J J being bolted thereto, as shown in Fig. 2, or otherwise fastened.

Before proceeding to describe the construction of the sluice valve itself, it may be pointed out that in the common method of constructing such sluice valves, and connecting them, the strain required to open and close them falls on the pipe B, tending to loosen and derange it, and as such force is considerable under high heads and with valves of large area, this disturbance of the main pipe is a frequent source of accident. The same strain falls both upward and downward on any structure to which the operating gearing is attached, which if disconnected from the valve causes dangerous strains in the superstructure. By connecting the valve and its operating gearing by the tubular stem G, or other suitable framing forming a strut between the two, the strains of opening and closing become inherent in the structure, and falls on this tube G without disturbing either the sluice pipe B or the superstructure D from which the valve is opened and closed. This strut or pillar G being open at the bottom the water rises therein to the level of the head at E.

Reverting now to the construction of the valve, which is made to accommodate the features hereinbefore described, the main frame or member K is cast with a flange L at the back to receive the pipe B, which is bolted thereto as shown in Figs. 1, 6 and 7. On the front is a planed surface a a on which the valve plate M slides up and down, opening and closing the main passage N. The valve plate is moved up and down by the stem I, which is inserted in socket O, and held by cross bolts b as shown in Fig. 3. On the top of the main frame or member K is formed a flange P to which is bolted a second flange Q into which is screwed or riveted a pipe or hollow post G. This hollow post or pipe G extends up above the water level E, and above the platform D, to receive the screw-nut bearing R, and hand wheel F, as shown in Figs. 1, 4 and 13. This screw-nut bearing R, is composed of two halves held together by bolts c c, and has an extension at the bottom into which the upper end of the strut G, is screwed, as shown in Fig. 13, or otherwise fastened as the shape or section may require. Into the top of this bearing R, is fitted loosely the screw nut S having collars d d, to prevent end movement by reason of the thrust on the screw stem I, when the valve is opened or closed. This screw nut S is attached to the hand wheel F by screws as shown in Fig. 13, which pass down through the hand wheel F, and are screwed into the upper collar d of the nut S.

Referring again to valve plate M: This is held in position by the side guides T which overlap the edges of the valve as shown in Figs. 3 and 8. These guides T are of an angular section as shown in Fig. 9 and terminate in short arcs at both ends, forming a stop for the valve plate M at the extreme of its upward and downward or opening and closing ranges, as shown in Figs. 3 and 8, the stops thus formed having their faces at an acute angle to the line of movement, also at an inclination vertically that guards against obstruction, such as is liable to occur when valve plates are stopped by abutting against stops having faces normal to the line of movement.

In the construction here shown it will be seen that the strains of opening and closing the valve are taken up by the hollow strut or pillar G, and there is no disturbing force on the pipe B, all strains being inherent in the valve and its direct connections, also, that such strains do not fall on the platform D, or other superstructure on which the valve operating mechanism is supported.

Having thus explained the nature and objects of my invention, what I claim as new, and desire to secure by Letters Patent, is—

1. In a valve, the combination of a water-way, a sliding valve plate sliding on and opening and closing said water-way, a valve frame with guides at the sides overlapping and guarding the valve plate as shown, the ends of these side guides terminating in curves corresponding to the perimeter of the valve plate so that the latter will be positively stopped by said curves at the ends of its stroke, the operating gearing to open and close the valve, and a rigid strut or tubular connection between the valve and said gearing said strut being rigidly supported and providing a passage for the valve stem and a platform supported above the level of the water by means of said strut or connection, substantially as specified.

2. In a sluice valve, the combination of the water-way a valve frame attached thereto, a sliding valve plate which opens and closes the water-way, side guides and curved stops on the valve frame for guiding and controlling the movement of the valve plate, a valve stem connected to the valve, a screw nut and wheel attached to the upper end of the valve-stem and operated to lift or lower said stem and its valve, and a strut or tubular connection between the valve and said gearing which is rigidly supported in an upright position so that the strain of opening and closing the valve may not act upon the valve itself but upon said connection and a bridge or platform supported above the level of the water by means of said strut or connection, substantially in the manner specified.

3. In a sluice valve, the combination of the water-way, a valve frame attached thereto, a valve-plate sliding on said frame and opening and closing the water-way, guides at the side of the frame overlapping and guarding the valve-plate as shown, the ends of these side guides terminating in curves corresponding to the perimeter of the valve plate, a strut or connection rigidly supported and extending upward from the valve, a bridge or platform supported above the level of the water by means of said strut or connection, the valve-stem within the strut attached to the valve-plate and an operating wheel at the upper end of said valve-stem for the purpose of sliding the valve-plate to open and close it, substantially as specified.

4. The combination of the subterranean water-way, the vertical valve frame having a flanged coupling thereon to receive said water-way, a sliding valve for opening and closing the water-way, guides at the sides of the valve-frame overlapping and guarding the valve-plate as shown, the ends of these side guides terminating in curves corresponding to the perimeter of the valve-plate so that the latter will be positively stopped by these curves at the ends of its stroke, a valve-stem the sleeve on the valve for receiving the valve-stem and the cross bolts for securing said stem to the valve, a strut or connection fastened to the valve frame and rigidly supported thereby, a bridge or platform supported above the water level by means of the said strut, a screw-nut bearing attached to the upper end of the strut, a screw nut supported thereby and engaging the upper screwthreaded section of the valve-stem and an operating wheel to which the screw nut is attached, all substantially as described.

5. The combination of the water way, a valve frame attached thereto, a valve-plate sliding on said frame and opening and closing the water-way, guides at the sides of the frame overlapping and guarding the valve-plate, a strut or connection rigidly supported and extending upward from the valve, a bridge or platform supported above the level of the water by means of said strut or connection and a valve-stem within the strut, attached to the valve-plate and provided at its upper end with means for operating the same, substantially as described.

In testimony whereof I have hereunto affixed my signature in the presence of two witnesses.

WILLIAM A. DOBLE.

Witnesses:
ALFRED A. ENQUIST,
WILSON D. BENT, Jr.